United States Patent
Kreuter

(10) Patent No.: US 6,637,405 B2
(45) Date of Patent: Oct. 28, 2003

(54) SUPPLEMENTAL CONTROL VALVE DEVICE FOR SUPPLEMENTAL FLOW CONTROL OF AN INTERNAL COMBUSTION ENGINE INTAKE CHANNEL

(75) Inventor: Peter Kreuter, Aachen (DE)

(73) Assignee: Meta Motoren-und Energie- Technik GmbH (DE)

( * ) Notice: Subject to any disclaimer, the term of this patent is extended or adjusted under 35 U.S.C. 154(b) by 0 days.

(21) Appl. No.: 10/212,372

(22) Filed: Aug. 2, 2002

(65) Prior Publication Data

US 2003/0024502 A1 Feb. 6, 2003

(30) Foreign Application Priority Data

Aug. 2, 2001 (DE) .......................................... 101 37 828

(51) Int. Cl.[7] .............................. F02D 9/08; F02B 27/02
(52) U.S. Cl. ........................................ 123/337; 123/399
(58) Field of Search ................................. 123/399, 337, 123/574, 336, 361, 398, 360

(56) References Cited

U.S. PATENT DOCUMENTS 4,412,517 A * 11/1983 Kobashi et al. ........ 123/339.26
5,415,142 A * 5/1995 Tsubakiji et al. ........... 123/336
5,666,913 A * 9/1997 Gustafson et al. ....... 123/90.16

FOREIGN PATENT DOCUMENTS

| DE | 611659 | 4/1935 |
| DE | 4314809 | 12/1996 |
| DE | 19908435 | 9/2000 |

* cited by examiner

*Primary Examiner*—Hieu T. Vo
*Assistant Examiner*—Johnny H. Hoang
(74) *Attorney, Agent, or Firm*—R W Becker & Associates; R W Becker

(57) ABSTRACT

A supplemental control valve device for supplementally controlling the flow through the intake channel of an internal combustion engine includes a flow body mounted in the intake channel and extending from an enlarged cross section of the intake channel into a reducing cross section of the intake channel. The flow body is configured in correspondence with the intake channel such that an annular gap is formed between the flow body and the intake channel. A valve member is supported on the flow body for movement between an open position in which the valve member is at a spacing from a valve seat on the intake channel at the transition of the upstream cross section and the enlarged cross section, and a closed position in which the valve member is seated against the valve seat such that the flow in the intake channel past the valve member is prevented.

12 Claims, 3 Drawing Sheets

SUPPLEMENTAL CONTROL VALVE DEVICE FOR SUPPLEMENTAL FLOW CONTROL OF AN INTERNAL COMBUSTION ENGINE INTAKE CHANNEL

BACKGROUND OF THE INVENTION

The present invention relates to a supplemental control valve device for supplemental control of the flow within the intake channel of an internal combustion engine.

DE 199 08 435 discloses a supplemental control valve device disposed in the intake channel of an internal combustion engine which is used to facilitate the impulse loading or charging of the combustion engine. In connection with an impulse loading in this arrangement, the supplemental control valve, which is disposed upstream of the conventional inlet valve of the internal combustion engine, is sealingly closed during the intake stroke of the piston during the time that the conventional inlet valve is in an open position so that a highly reduced pressure is created upstream of the supplemental control valve. Once the supplemental control valve is then opened, the in-flowing fresh loading receives a high impulse due to the thus created reduced pressure, whereby the filling of the combustion chamber is increased and a greater torque moment is achieved in comparison to an arrangement without impulse loading.

DE 43 14 809 A1, which the present invention improves upon, discloses a backflow valve disposed in the intake channel, which can, as necessary, be activated as well by remote force. The valve member is, for example, configured as a sealing body having a triangular cross-section, which is moveably guided via a shaft along a support element within the intake channel. The valve member can be activated solely by the pressure difference or, for example, by means of a position adjustment device such as, for example, a servomotor. The position adjustment device can include a mechanical linkage which projects into the intake channel from exteriorly thereof. The valve member can be configured as a truncated cone whose truncated peak is pulled inward. The valve member can be activated by means of an electromagnet or a pneumatic spring. A characteristic of the valve in accordance with the above-noted publication is that it leads to considerable turbulence and an increase in the resistance to flow through the intake channel.

DE 611 659 C1 discloses a rotational body configured in a sound dampening streamlined configuration, the displacement of which through its complete range operating to vary the cross sectional area of an annular gap.

SUMMARY OF THE INVENTION

The present invention provides a solution to the challenge of providing a supplemental control valve device in the intake channel of an internal combustion engine, which is of a simple configuration capable of handling the challenges provided in actual use to facilitate a more rapid flow through the intake channel due to only a minimum flow resistance influence and whose activation requires only relatively little energy.

In its open position, the supplemental control valve effects practically no increase on the flow resistance through the intake channel, as the top surface of the valve member in its opened position is seated in a flush manner on the balance of the oversurface of the flow body.

In connection with one aspect of the supplemental control valve device of the present invention, the flow body is further configured in an advantageous manner.

In connection with a further aspect of the supplemental control valve device of the present invention, it is achieved that the supplemental control valve device can be mounted in a simple manner in the intake channel, whereby, to effect actuation of the valve member, solely an electrical or, alternatively, a pneumatic or hydraulic, connection to the flow body is required.

In connection with a further additional aspect of the supplemental control valve member of the present invention, a very rapid and energy favorable actuation of the valve member is achieved.

The supplemental control valve device of the present invention can be deployed as well for impulse charging or loading and can be correspondingly configured therefor, such that, in an internal combustion engine, an operation without a throttle or butterfly valve is possible. Further, the supplemental control valve device provides additional operational freedom with respect to other types of load charging control arrangements.

The present invention is described in more detail in the hereinafter-following detailed description of a preferred embodiment thereof, taken in connection with the figures of the drawings.

DETAILED DESCRIPTION OF PREFERRED EMBODIMENTS

Figure 1:
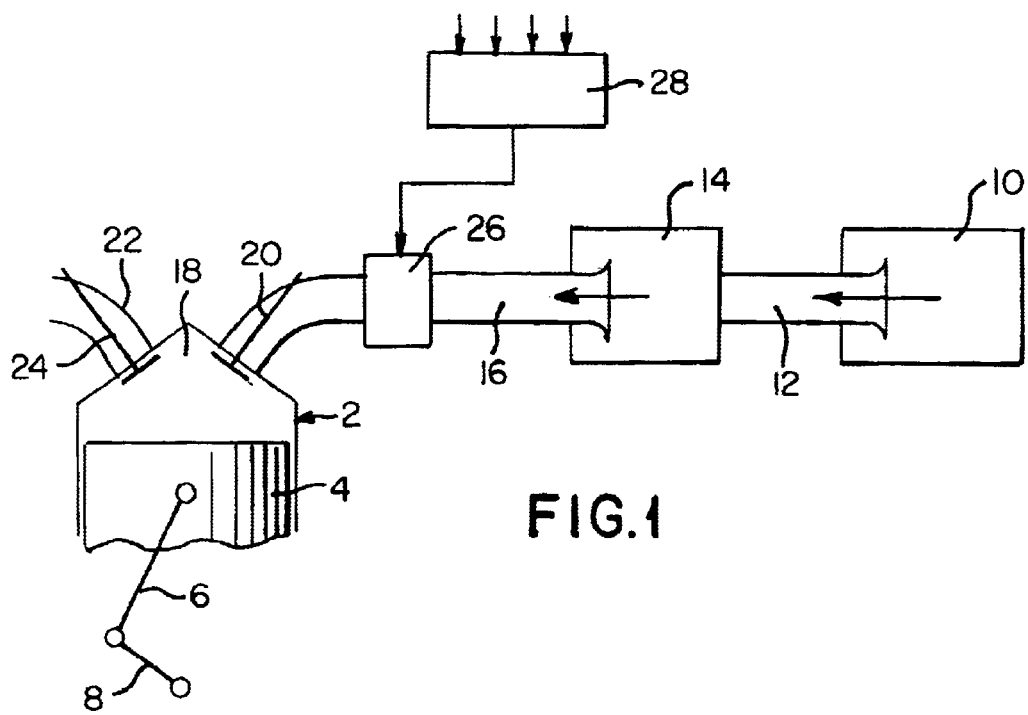
FIG. 1 is a schematic view of a cylinder of an internal combustion engine, showing several components of the intake system thereof.

As seen in FIG. 1, an internal combustion engine comprises a plurality of cylinders 2, in each of which a piston 4 is disposed and each piston is connected via a piston rod 6 with a crankshaft 8. The fresh air or, respectively, the fresh charging conduit to the cylinder 2, extends through an air filter 10, which is connected via a conduit 12 with an air collector 14. Oscillator conduits each forming an intake channel 16 extend from the air collector 14 to the combustion chamber 18 of the cylinder 2. At least one intake valve 20 is arranged in the outlet of each oscillator conduit, or respectively, each intake channel 16, into the combustion chamber 18. An outlet channel 22 having at least one outlet valve 24 opens into the combustion chamber. The configuration of the intake system having oscillator conduits is described only as an advantageous configuration, but is not strictly necessary.

A supplemental control or distribution valve device 26 is disposed in the intake channel 16 upstream of the intake valve 20, the supplemental control valve 26 having a supplemental control valve which is controlled by a control apparatus 28.

The manner of operation of the above-described arrangement, including the preparation of the air-fuel mixture, is conventionally known and is not further described herein.

Figure 2:
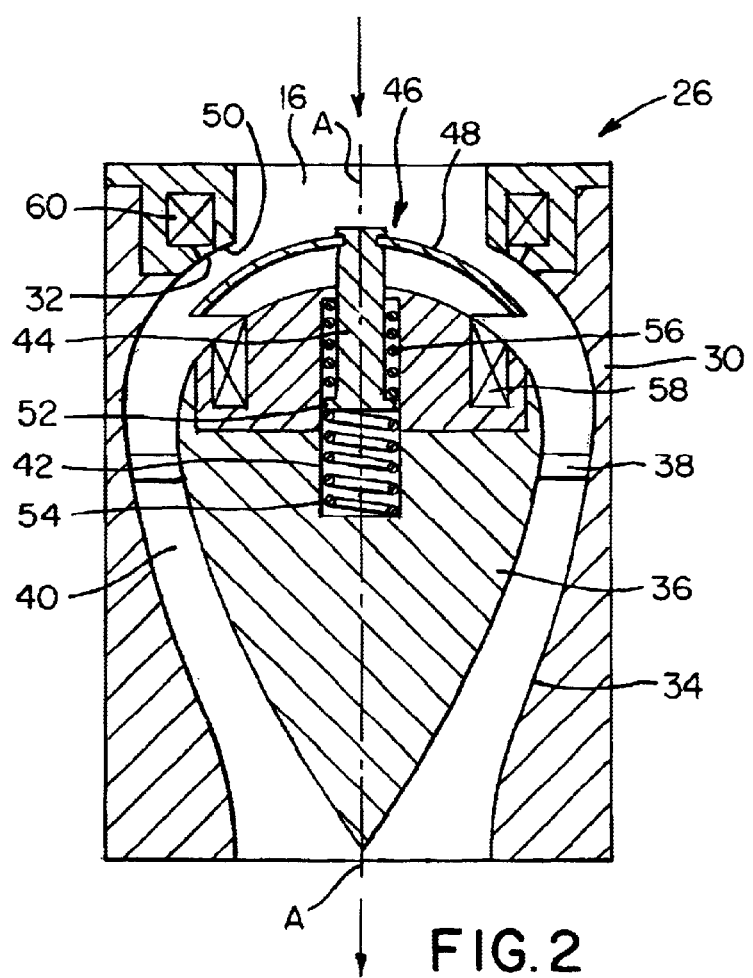
FIG. 2 is an enlarged sectional view of one embodiment of the supplemental control valve device of the present invention.

FIG. 2 is an enlarged sectional view taken through the supplemental control valve device 26 shown in FIG. 1. The air or, respectively, the fresh charge flow, direction is indicated by arrows in FIG. 2 from the top towards the bottom.

As can be seen, the supplemental control valve device 26 enlarges the downstream end of the intake channel 16 in which the supplemental control valve device is disposed, in that the inner wall of the intake channel body 30 includes a conically outwardly enlarged region 32. The enlarged region 32 transitions through the widest position into a tapering region 34, which eventually transitions smoothly into a portion of the intake channel 16, which is not shown, leading to the intake valve.

A flow body 36, having an overall streamlined configuration, is disposed in the enlarged region 32 and the tapering region 34 communicated therewith. The flow body 36 is supported within the intake channel body 30 via supports 38, which are, as well, configured in a flow facilitating or streamlined manner.

The flow body 36 is dimensioned and configured in correspondence with the inner walls of the intake channel body 30 such that an annular gap or clearance 40 is formed therebetween, the annular gap having an annular cross section. The flow cross section of the annular gap can reduce in the direction of flow, such as is known in connection with hydraulic or aerodynamic apparatus, and thereafter gradually increase again.

The flow body 36 includes, at its downstream end, a blind hole 42, which is co-axial with the axis A—A of the flow or, respectively, the entire arrangement. A shaft 44 on which a cap 48 is mounted is moveably guided within the blind hole, whereby the cap 48 is so formed and the contours of the enlarged regions 32 and the flow body 36 are so configured with respect to the cap 48 that the cap 48, in the upper closing position as shown in FIG. 2, is sealingly seated on a valve seat 50 formed in the interior of the enlarged region 32 and, in a lower opened position, is flush with the outer contour of the flow body 36, which has a recess corresponding to the cap 48 for receiving the cap therein. As can be seen, the cap 48 extends in a convex shape relative to the side of the flow body facing away from the inlet valve 20 with its crown on the axis A—A.

The shaft 44 terminates in a collar 52. A first spring 54 is disposed between the collar 52 and the base of the blind hole 42. A second spring 56 is disposed between the collar 52 and a collar formed on the upper end of the blind hole 42. In this manner, the valve member 46 forms, together with the two springs 54 and 56, an oscillation capable system, which is maintained in a middle position by the springs. The natural frequency of the oscillation capable system is set by the spring constants and the mass of the valve member 46.

The flow body 36 is, in total, configured of two pieces to facilitate the mounting of the valve member and the springs, whereby the upper piece and the lower piece can be connected to one another in any desired suitable manner.

An annular electro-magnet 58 is disposed in the upper portion of the flow body 36, the polar surface of the electro-magnet being freely accessible and magnetically cooperating with the cap 48, which comprises magnetic material. An additional annular magnet 60 is disposed in the intake channel body 30 in the region of the valve seat 50, whose polar surface magnetically cooperates, as well, with the cap 48. The electrical connections of the annular magnets 58 and 60, which electrically connect the annular magnets with the control apparatus 28, are not illustrated.

The manner of operation of the afore-described supplemental control valve control device 26 is as follows:

In connection with excitation of the annular magnet 58, the valve member 46, along with the cap 48, which may, as desired, be supported by the air flow, is moved out of the illustrated middle position against the force of the spring 54 into the open position in which the cap 48 lies against the polar surface of the annular magnet 58. If the annular magnet 58 is de-activated, the valve member is moved under the influence of the springs 54 and 56 in the direction towards the closed position in which the valve member is, via synchronized excitation of the annular magnet 60, held in a position in which the cap 48 is seated on the valve seat 50. If the magnet 60 is de-activated, the valve member is moved via the force of the springs into the opened position in which it is retained, with assistance of the magnet 58, and so forth. The natural frequency of the oscillation capable system is preferably higher than the frequency at which the valve is to be actuated, so that an exceptionally rapid changeover between the open and closed positions is possible, whereby only a sufficient retaining force from the magnets need be provided and the kinetic energy is stored in the springs.

To dampen the impact of the seating movement of the cap on the flow body 36 and the valve seat, corresponding seating surfaces can be provided so that the seating of the cap on the respective surface requires movement against an air cushion.

In connection with the deployment of the device for impulse loading or charging to achieve a high torque moment, the supplemental control valve remains closed, even during a low rate of revolution, during the intake stroke in which the intake valve is in its open position and the supplemental control valve is first opened during the continued open intake valve position, if a highly reduced pressure has been created. Fresh charge flows with high energy and effects a corresponding improved filling of the combustion chamber, whose intake valve is closed, before a backflow occurs. The supplemental control valve is then closed and stands ready for a new intake cycle. In the event that a throttle or butterfly valve is not present, the supplemental control valve can be actuated in coordination with the intake valve, such that, during an intake stroke, only a predetermined small amount of fresh loading reaches the combustion chamber.

The supplemental control valve device of the present invention offers numerous advantages.

It is configured with an overall rotationally symmetrical configuration, which helps to reduce the production costs.

It is flow facilitating, whereby hardly any flow or turbulence losses occur, thus clearly improving the effectiveness of an impulse load or charge.

It requires only a small amount of electrical energy, as the required kinetic energy is stored in the springs.

The opening of the valve is exceptionally quick, as it is reinforced by the reduced pressure or, respectively, the flow, which results therefrom.

In its closed position, the supplemental control valve device achieves a reliable gas-tight seal.

The rest or, respectively, middle, position can be varied in a simple manner, such that the base point of the spring 54 is varied by an adjustment screw (not shown) threaded into the flow body 36.

The valve member, which overall forms an anchor, can be configured with minimal dimensions with good magnetic characteristics in that the cap 48 can be configured with radially differing wall thicknesses with sealing features in the magnetically active region and tapering features in the non-magnetic region. Furthermore, it is possible to secure a magnetic material in the magnetically active region with a mechanically strong retention material, such as, for example, a composite material, having a low specific mass.

Due to the bell shaped configuration of the cap, the cap exhibits a high structural integrity while, at the same time, providing a favorable flow facilitating configuration. Due to its cap shape, the anchor exhibits a certain elasticity, whereby the guiding of the shaft can include, additionally, a certain free play so that the valve member is self-centering, tolerances are compensated, and only relatively soft impact noises occur.

The afore-described supplemental control valve device can be produced as a module and is installable in available or pre-existing intake channels in a simple manner.

As a result of the rapid controllability of the valve member, it is possible not only to use the supplemental control valve device for an impulse-loading situation, but also to deploy the device in lieu of a throttle or butterfly valve, whereby cost savings can be realized and energy savings can be achieved.

The angle which the valve seat forms with the middle axis is determined by the seal requirements and the flow and is, for example, 45 degrees.

It is additionally advantageous if both of the annular magnets 58 and 60 have substantially the same radial diameter, such that their polar surfaces stand in approximate opposing relation to one another. In this manner, short field lines in the anchor position are achieved and a relatively small anchor mass is made possible. Via the jet or, respectively, the diffusion, flow in the annular gap 40, a targeted speed increase or, respectively, speed slow down is achieved, whereby, in total, only minimal flow losses occur.

Figure 3:
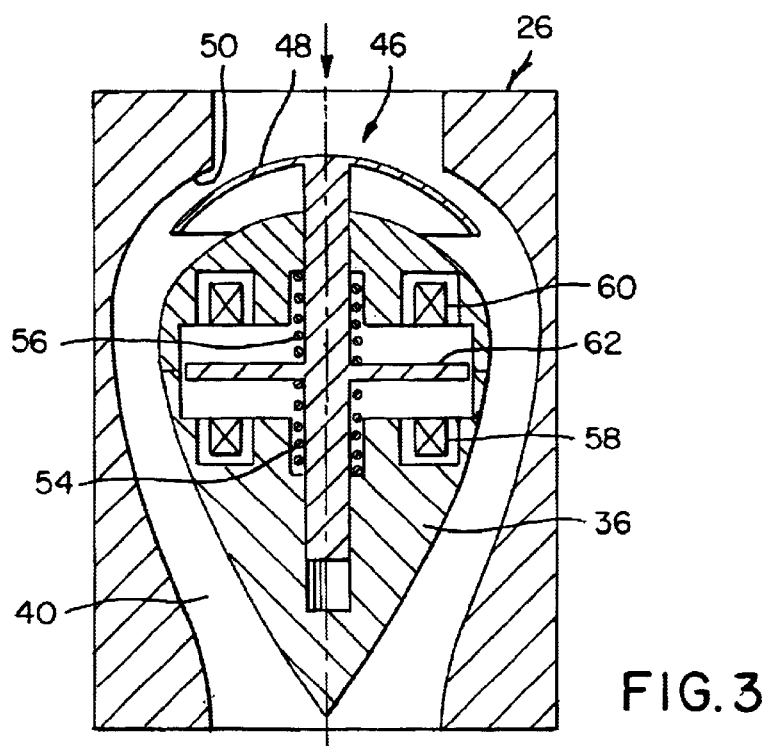
FIG. 3 is an enlarged sectional view of another embodiment of the supplemental control valve device of the present invention.

FIG. 3 shows another embodiment of a supplemental control valve device 26 which differs from the embodiment shown in FIG. 2, whereby the collar 52 of the embodiment shown in FIG. 2 is expanded into an anchor plate 62 and the annular magnets 58 and 60 are received within the flow body 36. Otherwise, the function of the embodiment shown in FIG. 3 corresponds to that of the embodiment shown in FIG. 2. Since the closed position of the valve member 46 is not thereby defined in the embodiment shown in FIG. 3 such that the cap 48 is directly held by a magnetic force in a seated position on the valve seat 50, but, instead, the anchor plate 62 is retained by the annular magnet 60, it is advantageous, in order to compensate for tolerances, to configure the cap 48 to be somewhat more elastic, which is possible in that the cap 48 need not necessarily be comprised of magnetic material.

Otherwise, the embodiment shown in FIG. 3 provides the same advantages as are provided by the embodiment shown in FIG. 2. As the angle of the valve seat 50, which defines the angle throughout the fresh loading flows through the annular gap 40, need not be determined by the magnetic retaining force but is, instead, principally determined from the point of view of the flow, the angle can be a larger angle such as, for example, an angle of 50 degrees.

Figure 4:
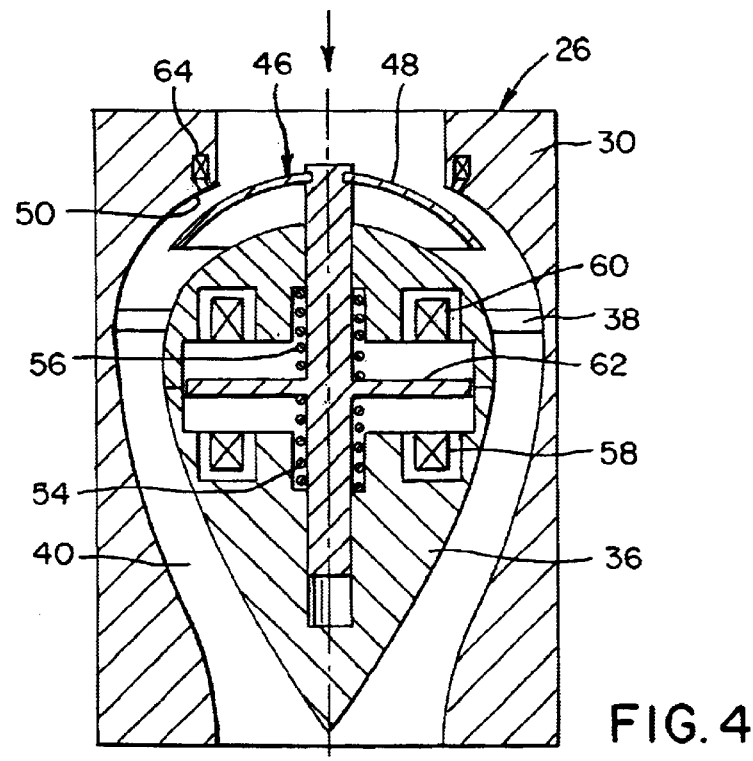
FIG. 4 is an enlarged sectional view of a further embodiment of the supplemental control valve device of the present invention.

FIG. 4 shows an embodiment of the supplemental control valve device 26 of the present invention, different than the embodiment thereof shown in FIG. 3, which unites the details of the embodiments of the supplemental control device shown in FIG. 3 with those of the embodiment shown in FIG. 2 in that, in addition to the annular magnets 58 and 60 of the embodiment shown in FIG. 3, a further annular magnet 64 is disposed in the region of the valve seat 50 in the intake channel body 30. The additional annular magnet 64 directly draws the cap 48, which at least partially comprises magnetically active material, onto the valve seat 50. The annular magnet 60 serves to capture and retain the anchor plate 62 in the closed position. The additional annular magnet 64 serves to capture and retain the cap 48 in its sealing seating on the valve seat 50.

Figure 5:
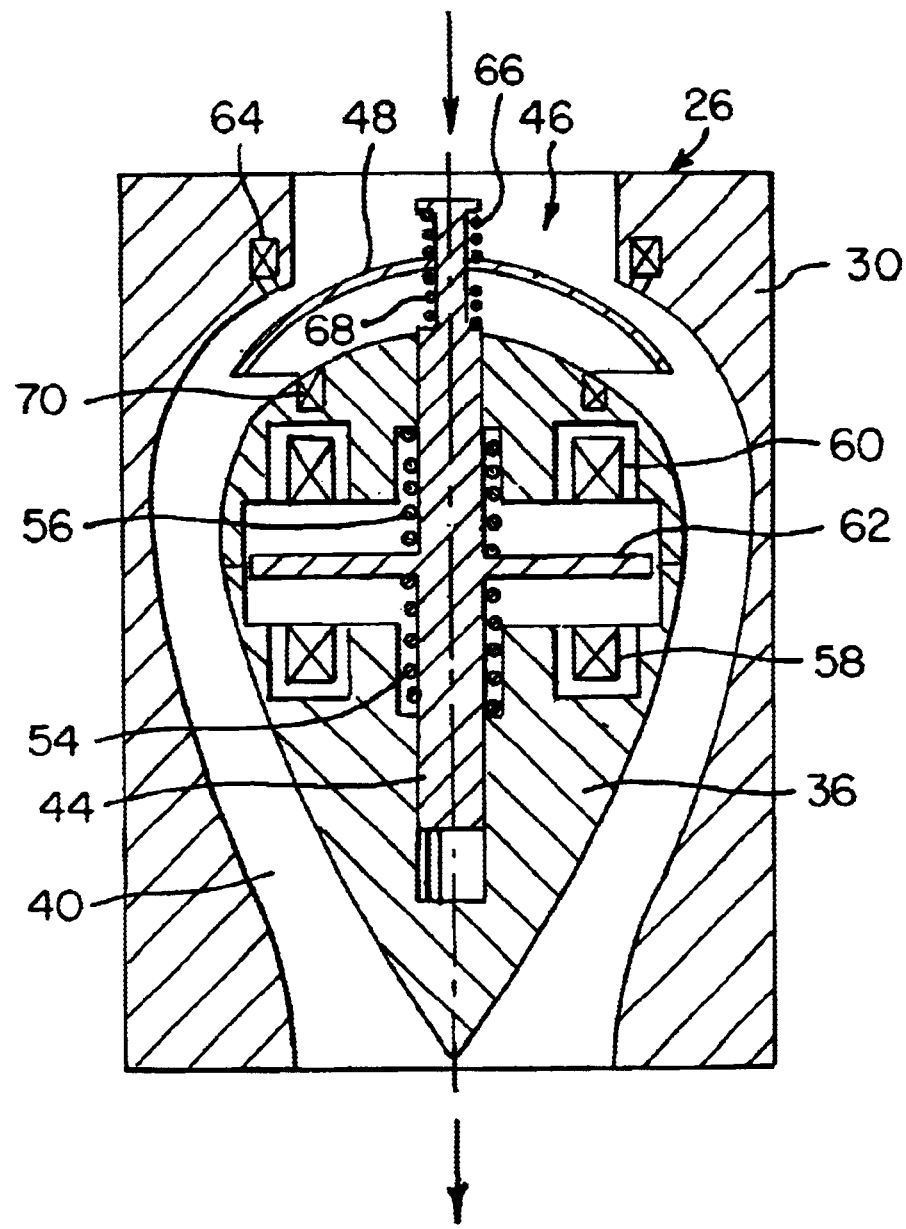
FIG. 5 is an enlarged sectional view of a further additional embodiment of the supplemental control valve device of the present invention.

FIG. 5 shows an embodiment of the supplemental control valve device of the present invention which differs from that shown in FIG. 3. In the embodiment shown in FIG. 5, the cap 48 is moveably guided on the shaft 44 and is biased into a middle position by the opposed biasing action of two springs 66 and 68, which are disposed in counter opposition to one another between the cap 48 and the shaft 44, whereby the cap, along with the springs, form an oscillation capable system relative to the shaft. Similar to the annular magnet 64 of the embodiment shown in FIG. 4, an annular magnet 64 is disposed in the intake channel body 30 in the embodiment shown in FIG. 5. An additional annular magnet 70 is disposed in the flow body 36. The annular magnets 64 and 70 preferably form a pure retaining magnet arrangement for retaining the cap 48 in its opened or closed position, while the magnets 58 and 60 operate as capture magnets for the anchor plate 62. The magnets 64 and 70 can, correspondingly, be dimensioned with relatively smaller dimensions. In the embodiment shown in FIG. 5, the advantage of shorter switch times between open and closed positions of the valve is achieved. In connection with the operation of the embodiment of the supplemental control valve shown in FIG. 5, assume that the valve is disposed in its closed position—that is, the cap 48 is seated on the excited annular magnet 64 and the anchor plate 62 is seated against the excited annular magnet 60—whereupon the operation unfolds as follows. If the valve is then to be opened, the magnet 60 is de-activated and the magnet 58 is activated so that the anchor plate 62 is moved, via the bias of the springs 52, 54, into position on the ring magnet 58 and is retained thereagainst. The retaining magnet 64 initially remains excited so that the cap 48 remains in its closed position, whereby the shaft 54, due to the deformation of the springs 66, 68, moves relative to the cap 48 in a downward direction, as viewed in FIG. 5. If the magnet 64 is then de-activated—for example, shortly before the anchor plate has reached its lower position—the cap 48, under the biasing influence of the springs 66 and 68, accelerates toward and into position against the magnet 70 and is held thereat in the open position. The effective switching time of the valve, which sets the operational time during which the cap moves from the closed to the open position and returns from the open position to the closed position, is thus shortened, whereby the load charging losses are minimized and a precise control is made possible. The delayed de-activation of the retaining magnets 60 and 70 relative to the capture magnets 60 and 58, respectively, is stored as energy in the oscillation system 48, 66, 68, which can then be expended for an accelerated movement of the cap. It is to be understood that the middle position of the cap is preferably selected relative to the positions of the anchor plate such that the cap is securely seated, in its respective closed and open positions, on the polar surfaces of the magnets 64, 70 without activation thereof.

The disclosed supplemental control valve can be embodied in numerous variations: the retaining magnets 64 and 70 of the embodiment shown in FIG. 5 as well as the retaining magnet 64 of the embodiment shown in FIG. 4 can be configured as permanent magnets whose strength is selected relative to the springs and the capture magnets such that the retaining magnets suitably release the cap 48 for its movements. The valve member need not necessarily be comprised as a component of an oscillation capable system. The activation of the valve member can be effected by hydraulic, pneumatic, or other means in that corresponding guidance of the valve member can be effected, for example, by the supports 38. Air can be evacuated from the base of the blind hole 42 and the shaft can be configured in correspondence with the blind hole to have a step—type cross section such that the movement of the valve member can be damped in various ways prior to the complete seating of the valve member into its open and closed positions. The magnets 64 and 70 of the embodiment of the supplemental control valve shown in FIG. 5 can also be omitted to provide for tolerance compensation. The features of the various embodiments of the supplemental control valve can be combined with one another in various ways.

The specification incorporates by reference the disclosure of German priority document 101 37 828.9 filed Aug. 2, 2001.

The present invention is, of course, in no way restricted to the specific disclosure of the specification and drawings, but also encompasses any modifications within the scope of the appended claims.

What is claimed is:

1. A supplemental control valve device for supplementally controlling the flow through the intake channel of an internal combustion engine, the intake channel having an upstream cross section, an enlarged cross section downstream of the upstream cross section at which the cross section of the intake channel enlarges from its upstream cross section to a cross section greater than the upstream cross section, and a reducing cross section downstream of the enlarged cross section along which the cross section of the intake channel reduces from the enlarged cross section to a lesser cross section, the supplemental control valve device comprising:

a flow body mounted in the intake channel and extending from the enlarged cross section of the intake channel into the reducing cross section of the intake channel, the flow body being configured in correspondence with the intake channel such that an annular gap is formed between the flow body and the intake channel; and a valve member supported on the flow body for movement between an open position in which the valve member is at a spacing from a valve seat on the intake channel at the transition of the upstream cross section and the enlarged cross section and forms the upstreammost portion of the flow body against which the flow in the intake channel flows before the flow passes through the annular gap, and a closed position in which the valve member is seated against the valve seat such that flow in the intake channel past the valve member is substantially prevented, the flow body being correspondingly configured relative to the intake channel such that the contour of the annular gap extends in the flow direction in a non-step manner without any abrupt change and the valve member and the flow body being configured in correspondence with one another such that, in a position in which the valve member permits the maximum flow therepast, the valve member seats against the flow body in a substantially flush manner.

2. A supplemental control valve device according to claim 1, wherein the flow body tapers to a peak at its downstream end.

3. A supplemental control valve device according to claim 1, and further comprising an activation assembly integrated into the flow body for facilitating movement of the valve member between its open and closed positions.

4. A supplemental control valve device according to claim 3, wherein the activation assembly includes a magnet selectively excitable to magnetically attract the valve member into its open position, another magnet selectively excitable to magnetically attract the valve member into its closed position, and a pair of springs each biasing the valve member in a respective direction opposite to the direction in which the valve member is biased by the other spring, the pair of springs collectively maintaining the valve member is a middle position intermediate its open and closed positions and the magnets being selectively excited to maintain the valve member in its respective open and closed positions.

5. A supplemental control valve device according to claim 1, wherein the valve member includes a shaft supported in the flow body for guided extension and retraction of the shaft relative to the flow body and a cap mounted on the free end of the shaft having an overall convex curvature, the upstream surface of the cap seating against the valve seat in the closed position of the valve member and the upstream surface forming a portion of the outer surface of the flow body in the open position of the valve member.

6. A supplemental control valve device according to claim 5, wherein the shaft includes a collar and a pair of springs each acting against the collar on a respective side thereof to bias the valve member in a respective direction opposite to the direction in which the valve member is biased by the other spring.

7. A supplemental control valve device according to claim 6, and further comprising a magnet selectively excitable to magnetically attract the valve member into its open position in which the valve member is seated against the flow body, and another magnet selectively excitable to magnetically attract the valve member into its closed position in which the valve member is seated against the valve seat, the magnets being selectively excited to maintain the valve member in its respective open and closed positions.

8. A supplemental control valve device according to claim 7, wherein the one magnet is disposed at substantially the same radius from the axis of the intake channel as the other magnet.

9. A supplemental control valve device according to claim 7, wherein the collar is comprised in an anchor plate which is magnetically active such that excitation of the one magnet magnetically attracts the collar to thereby move the valve member into its open position and excitation of the other magnet magnetically attracts the collar to thereby move the valve member into its closed position.

10. A supplemental control valve device according to claim 9, and further comprising an additional magnet disposed adjacent to the valve seat in the intake channel, the cap being at least partially comprised of magnetically active material such that excitation of the additional magnet magnetically attracts the cap into its seated disposition on the valve seat.

11. A supplemental control valve device according to claim 9, wherein the cap is axially adjustably mounted on the shaft and the cap is maintained in a middle mounted position on the shaft by a pair of springs each acting against the cap on a respective side thereof to bias the cap in a respective direction opposite to the direction in which the cap is biased by the other spring.

12. A supplemental control valve device according to claim 11, and further comprising an electro-magnet disposed adjacent to the valve seat in the intake channel such that excitation of the electro-magnet magnetically attracts the cap into its seated disposition on the valve seat, and an additional electromagnet disposed adjacent to the flow body such that excitation of the additional electromagnet magnetically attracts the cap into its open position in which it is substantially flush with the flow body.

* * * * *